United States Patent [19]

Beers et al.

[11] 4,066,598

[45] Jan. 3, 1978

[54] ZINC ENRICHED LITHIUM SILICATE-LATEX COATING COMPOSITION

[75] Inventors: Ronald W. Beers, Spring, Tex.; Julian Lakritz, Edison, N.J.

[73] Assignee: Matcote Company, Inc., Tex.

[21] Appl. No.: 528,526

[22] Filed: Nov. 29, 1974

Related U.S. Application Data

[60] Division of Ser. No. 319,969, Dec. 29, 1972, Pat. No. 3,884,863, which is a continuation-in-part of Ser. No. 93,389, Nov. 27, 1970, abandoned, which is a continuation-in-part of Ser. No. 708,785, Feb. 28, 1968, abandoned.

[51] Int. Cl.² ............... C08L 9/04; C08L 9/08; C08L 13/02; C09D 5/10
[52] U.S. Cl. ............... 260/29.7 S; 252/389 R; 260/42.13; 260/42.22

[58] Field of Search .............. 106/14; 260/29.7 S, 260/42.13, 42.22; 252/389 R, 392

[56] References Cited

U.S. PATENT DOCUMENTS

| 2,821,514 | 1/1958 | Sarbach et al. ............ 260/29.7 S |
| 3,180,746 | 4/1965 | Patton et al. ............. 260/29.6 S |
| 3,475,185 | 10/1969 | Freyhold ..................... 106/14 |

*Primary Examiner*—Allan Lieberman
*Attorney, Agent, or Firm*—Pravel, Wilson & Gambrell

[57] ABSTRACT

A zinc-enriched protective coating comprises a vehicle containing an alkali-lithium silicate solution with sufficient alkali silicate, preferably lithium, to provide a self-curing one-coat composition, an organic interpolymer latex to provide improved adhesion, and zinc dust to provide cathodic protection.

7 Claims, No Drawings

4,066,598

ZINC ENRICHED LITHIUM SILICATE-LATEX COATING COMPOSITION

CROSS REFERENCE TO RELATED APPLICATION

This is a division, of application Ser. No. 319,969, filed Dec. 29, 1972, now U.S. Pat. No. 3,884,863.

This application is a continuation-in-part of Ser. No. 93,389, filed Nov. 27, 1970 now abandoned, which is a continuation of Ser. No. 708,785 filed Feb. 28, 1968, now abandoned in the names of Ronald W. Beers and Julian Lakritz, entitled "Zinc Enriched Lithium Silicate-Latex Coating Composition."

BACKGROUND OF THE INVENTION

The present invention is directed to a vehicle comprising an alkali silicate solution and an organic interpolymer latex and coatings therefrom, which possess unusual adhesion to any type of substrate commonly encountered in coating applications. The vehicles of the present invention have excellent package stability and film forming properties, and the coating compositions made by pigmenting with high loadings of zinc dust impart the same excellent corrosion resistance associated with the prior art zinc-rich inorganic coatings.

Heretofore, the prior art zinc-rich inorganic coatings had poor adhesion to metallic substrates unless the surface was properly prepared by sandblasting the surface free of all contaminants, such as, rust and mill scale. Such prior art zinc-rich inorganic coatings are illustrated by U.S. Pat. Nos. 3,180,746 and 3,130,061. Other prior art considered with respect to the present invention is represented by the following listed U.S. Pat. Nos.: 2,476,967, 2,767,153, 2,795,564, 2,897,182, 2,980,652, 3,231,535, 3,231,537, 3,261,796, 3,261,797, and 3,261,799.

SUMMARY OF THE INVENTION

The present invention discloses a new composition for a zinc-enriched coating which comprises an alkali-silicate solution and an organic interpolymer latex, the latex preferably stabilized with an alkali-stable anionic surfactant. The alkali-silicate solution is preferably a mixture of sodium and lithium silicate in amounts sufficient to provide a molar ratio of sodium oxide to lithium oxide to silicon dioxide, respectively, within the range from about 0 to 0.7 $Na_2O$ : 0.3 to 1.0 $Li_2O$ : 2.5 to 4.5 $SiO_2$. Instead of the sodium silicate as the specific alkali silicate in the alkali-lithium silicate solution, potassium, or quaternary ammonium silicates or mixtures thereof may be used. It is preferred but not essential that lithium silicate be included in the composition as one of the silicates. Lithium silicate is especially useful as a component of the solution when high water resistance is desired. The vehicles of the present invention are suited for pigmentation with high loadings of zinc dust which produce a single-application zinc-enriched coating composition with excellent adhesion and protection against corrosion of the substrates.

The coating compositions of the present invention are usually packaged as two component systems. The zinc dust and any other solid pigment used in the coating composition is packaged as one component. The vehicle of the present invention together with any liquid additives is packaged as a second component. The two components are mixed prior to the application of the mixture to the desired surface. It has been found, according to the present invention, that less surface preparation is required than when prior-art zinc-rich inorganic coatings are used. Further, the coating compositions of the present invention become water insensitive within a short period of time and do not require the use of a curing agent. However, curing agents such as phosphoric acid may be used to accelerate the cure when adverse conditions are encountered, and inhibitors such as chromates may be added to the composition. Curing agents are preferred for compositions that do not contain a lithium or quaternary ammonium component.

DETAILED DESCRIPTION

The vehicle component of the present invention comprises an aqueous alkali-silicate solution and an organic interpolymer latex. The aqueous alkali-silicate solution portion of the vehicle is made so as to contain preferably a mixture of sodium and lithium silicates in amounts sufficient to provide a molar ratio of sodium oxide to lithium oxide to silicon dioxide, respectively, within the range from about 0 to 0.7 $Na_2O$ : 0.3 to 1.0 $Li_2O$ : 2.5 to 4.5 $SiO_2$. A preferred molar ratio of sodium oxide to lithium oxide to silicon dioxide, respectively, is within the range from about 0.25 to 0.65 $Na_2O$ : 0.35 to 0.75 $Li_2O$ : 2.5 to 4.5 $SiO_2$. The alkali is preferably sodium and lithium in the alkali mixture; however, any Group 1A metal silicate or quaternary ammonium silicates, or mixtures in any combination, may be used in the formulations of the invention. The quaternary ammonium compound should be nonhygroscopic and water soluble.

Typical formulations of the alkali-lithium silicate solution, organic interpolymer latex and anionic surfactant are given below:

|  | Parts by Wt. of Solids | | |
|---|---|---|---|
| Alkali-lithium silicate sol'n. | 91 | 69.0 | 57 |
| Interpolymer latex | 9 | 29.5 | 40 |
| Anionic Surfactant | 0 | 1.5 | 3 |
|  | 100 | 100.0 | 100 |

As noted above, the formulations are based on weight of solids. Formulations having the best properties as to adhesion and corrosion contain about 15 to 30 parts by weight of solids of the interpolymer latex. The total solids of the silicate solutions is measured by heating a weighed quantity of the silicate solution at 110° C. for 2 hours and then weighing to determine the percent of solids. The total solids of the organic interpolymer latexes, on the other hand, are determind by heating at 105° C. for only 30 minutes.

The alkali-lithium silicate solutions of the present invention may be obtained by the addition of a sodium silicate solution to a sodium-lithium silicate solution having a molar ratio of 0.25 $Na_2O$ : 0.75 $Li_2O$ : 4.5 $SiO_2$ made in accordance with the disclosure of U.S. Pat. No. 3,180,746 and having a solids content of 25 to 30 percent by weight and a viscosity of between 30 to about 40 centipoises (77° F.). Sodium silicate solutions having molar ratios of $Na_2O$ : $SiO_2$ of between 1 : 2.4 to about 1 : 3.75 may be added to the foregoing described sodium-lithium silicate solution to produce the alkali-lithium silicate solutions of the present invention. It is to be understood, however, that the alkali-lithium silicate solutions may also be produced directly by the method disclosed in U.S. Pat. No. 3,180,746 by adjusting the amounts of lithium hydroxide, and sodium, potassium or quaternary ammonium hydroxide added to the silica-containing materials such as silicic acid or silica gel before heating.

Furthermore, the alkali-lithium silicate solutions may be obtained by the addition of lithium hydroxide and sodium, potassium or quaternary ammonium hydroxide to alkali stabilized colloidal silica solutions. The alkali stabilized colloidal silicas are marketed under the tradenames "Ludox" by E. I. duPont de Nemours, "Syton" by Monsanto Chemical Company and "Nalcoag" by National Aluminate Company.

According to the present invention, it has been found that the addition of an organic interpolymer latex together with an alkali silicate solution provides a vehicle which has unusual adhesion to substrates commonly encountered in coating applications. The organic interpolymer latexes used in the present invention may be known alkali-stable polymers of copolymerizable vinyl compounds which form interpolymers capable of being cast to form films from aqueous solutions. The term "latex" designates an aqueous dispersion of the interpolymer which is present in the form of very fine particles.

Illustrative of the organic interpolymers which are used in the latexes of the present invention are the polyacrylates which are mixtures of monovinylidene esters, the monovinylidene carboxylic acids, or mixtures of esters and acids. Since the monomers when polymerized by themselves yield either soft or brittle polymers which do not have the desired film forming properties, a mixture of the monomers is used to form the desired interpolymers. Typical ester monomers which are used are methylacrylate, methylmethacrylate, ethylacrylate, ethylmethacrylate, propyl acrylate, propyl methacrylate, isopropyl acrylate, butyl acrylate, isobutyl acrylate, butyl methacrylate, tert-butyl acrylate, amyl methacrylate, 2-ethylhexyl acrylate, 2-ethylhexyl methacrylate, hexyl methacrylate, octyl methacrylate or other primary, secondary or tertiary alkyl having 2 to 18 carbon atoms, acrylates, or methacrylates, or alkoxyalkyl acrylates or methacrylates such as butoxy ethyl acrylate or methacrylate, etc. The acid monomers are preferably methacrylic or acrylic acid but other acids having vinyl groups such as itaconic, fumaric, maleic, acid or the salts of the acids may be used. Further, the "acrylates," meaning interpolymers made predominantly of the foregoing monomer, may be modified by using acrylonitrile or methacrylonitrile, vinylacetate, a vinyl halide such as vinyl chloride, a vinyl aromatic such as styrene and the like which co-polymerize with the monovinylidene ester and acid monomers. Specific interpolymers of the acrylate-type are disclosed in U.S. Pat. No. 2,795,564.

Other organic interpolymers which may be used in the latexes of the present invention are interpolymers of diolefins and vinyl compounds such as vinyl aromatic compounds, acrylonitrile, vinyl halides and the acrylates. The diolefin is preferably butadiene but isoprene and substituted butadiene such as 2,3-dimethylbutadiene-1,3 may also be used. The preferred vinyl aromatic compound is styrene; however, lower alkyl substituted styrene and vinyl naphthaline, etc. may be used such as disclosed in U.S. Pat. No. 2,767,153. Interpolymers such as styrene/butadiene/maleic acid may be used. Particular interpolymers containing the diolefin are disclosed in U.S. Pat.No. 2,476,967.

Preferred interpolymers for use in the latex of the present invention are the interpolymers containing a nitrogen compound having at least one reactive hydrogen attached to the nitrogen. Such interpolymers may contain monovalent aminoesters, cyclic amines, and heterocyclic nitrogen compounds. These interpolymers are referred to herein as "aminoester" interpolymers and are aminoesters of unsaturated carboxylic acids such as illustrated above. These interpolymers have outstanding adhesion toward various substrates and exhibit outstanding solvent resistance. Such interpolymers are illustrated in U.S. Pat. Nos. 2,897,182; 2,980,652; 3,261,797; and 3,261,799. This latter patent describes preparation of aminoester latices as such.

It is preferred, according to the present invention, to use an anionic surfactant to improve the stability of the interpolymer latex, especially to improve shelf-life and wetting of the substrate by the formulated coating composition, although a non-ionic surfactant may be employed. By shelf-life is meant the ability of the vehicle to be stored for long periods of time without separation. A preferred anionic surfactant is the sodium salt of dodecyldiphenylether sulfonate (for example, Benax 2A1, a product of the Dow Chemical Company). Other suitable surfactants are those stable in alkali media such as alkali salts of acid phosphate esters of alcohols, phenols, ethoxylated derivatives of alcohols, alkyl phenols and the like. The phosphate esters are commercially available as Gafac (a product of General Aniline).

A preferred vehicle of the present invention may be prepared by adjusting the alkali-lithium silicate solution and the stabilized interpolymer latex to approximately equal solids content and adding the silicate solution to the latex under good mixing. Alternatively, diluent water and stabilizing surfactant may be initially added to the latex, and the latex solution, adjusted to to about the same solids content as the silicate solution, is then added to the alkali-lithium silicate solution while stirring at high speed. Either method of preparation yields a vehicle having a long shelflife.

To the vehicles of the present invention is added zinc dust to form zinc-enriched coating compositions. The vehicles and zinc dust are formulated in accordance with the following general formula:

|  | Parts by Weight | Optimum |  |
|---|---|---|---|
| Vehicle (26% NVM) | 33 | 23.4 | 20 |
| Zinc dust | 67 | 76.6 | 80 |
|  |  | 100.0 |  |

The coating compositions are described in terms of total weight. Thus, the vehicle when expressed as 26% NVM, means 26% non-volatile materials or total solids.

The zinc has a particle size between 2 to about 50 microns in diameter and preferably the particles have a size within the range of 5 to 20 microns in diameter. The zinc may be added in an amount from 66% to about 80% by weight of the coating composition, and the coating compositions will impart increasing corrosion resistance to metal, especially carbon steel, as the amount of zinc is increased.

In addition to the composition previously discussed, certain other materials, generally referred to as pigments, may be added singly, collectively, or in various combinations to impart certain desired properties to the coating compositions. Several of these "pigment additives" and the desirable characteristics they provide are as follows:

1. Inorganic ceramic pigments (metallic oxides which alone or in various combinations yield desired colors) — Examples of the metallic oxide pigments are cobalt/aluminum, cobalt/chrome, cadmium, and cadmium aluminum. The preferred pigments are those commonly used in tinting ceramics.

2. Zinc oxide pigment — Enhances the abrasion resistance and overall "smoothness" of the coating surface by contributing comparatively minute (0.1–1 micron diameter) particles to the coating formulation.

3. Aluminum silica-phosphate pigment — Performs the same function as zinc oxide.

4. Titanium dioxide pigment — In addition to enhancing the abrasion resistance of the coating, titanium dioxide contributes its excellent hiding properties (brought about by a very high index of refraction).

The coating compositions of the present invention may be applied to metal surfaces which have been prepared by commercial sandblasting techniques or by wire brushing. The sandblasting need only to remove loose mill scale and rust, and need not be sandblasted to white metal as is required for the commercially available prior art zinc-rich inorganic coating compositions. The coating compositions are applied to the surface by brushing, rolling or spraying to obtain a dry film thickness of about 1 to 12 mils in thickness. A preferred dry film thickness is about 3 to 6 mils. To obtain the preferred dry film thickness, a wet film of about 6 to 10 mils of the coating composition is applied to the surface.

The present invention will be further illustrated by the following specific examples which are given by way of illustration and not as limitations on the scope of the present invention. Where precentages are given they are understood to be weight percents.

EXAMPLE I

A lithium-sodium silicate solution used in this invention without the addition of any additive materials may be formed in the following manner:

Water, silica gel, lithium hydroxide, and sodium hydroxide are charged into a stainless steel pressure vessel equipped with an agitator. During the initial mixing of these ingredients, evolution of heat raises the temperature of the contents to 50° C. to 55° C. The reactor is then sealed and the temperature of the reactants, under a continual agitation is raised to 150° C. for a period of time, which may vary from 30 to 90 minutes. After the vessel reaches about 150° C. and about 70 psi pressure, the contents are slowly cooled at a rate of about 0.61° C. to about 1.83° C. per minute. This will result in a temperature drop from 150° C. to about 95° C. within about 30 to about 90 minutes. This completes the initial part of the reaction which forms the solid sodium-lithium silicates.

The second part of the operation (below 95° C.) requires a longer period of time in order to effectively dissolve the solid silicates at the lower temperatures. The reduction of the temperature of the reactor contents from 95° C. to 40° C. is at a rate of about 0.37° C. to 0.416° C. per minute and is accomplished in 150 minutes to 240 minutes. The last temperature drop from 40° C. to 25° C. may be conducted over a period of 60 to 120 minutes and a cooling rate of about 0.25° C. to about 0.125° C. per minute.

Depending on the amount of water used, the vehicle may be used in different solid ratios, i.e. the total solids of the vehicle may vary from about 10% to 45% by weight, preferably the solids contents is between about 25% to about 30% by weight.

EXAMPLE 2

A vehicle was prepared in the manner similarly described in Example 1 except it was made of the following ingredients:

| | Parts by Weight |
|---|---|
| Sodium Hydroxide | 8 |
| Lithium Hydroxide Mono-hydrate | 34 |
| Silica Gel | 126 |
| Water | 400 |

This vehicle may be described as $0.25\ Na_2O : 0.75\ Li_2O : 4.5\ SiO_2$ or having a molar ratio of $Li_2O$ to $Na_2O$ of 3/1 and a molar ratio of $SiO_2$ to the combined $Li_2O$ and $Na_2O$ of 4.5/1. The vehicle had a total solids content of about 27 weight percent but may vary between 26 to 28 weight percent. The viscosity of the vehicle was 36 to 37 centerpoises, with a specific gravity of about 1.194 to 1.195.

EXAMPLE 3

A vehicle of the present invention was prepared as follows:

| | Parts by Weight |
|---|---|
| Part A | |
| Sodium-Lithium Silicate Solution of Example 2 | 55.0 |
| Sodium Silicate Solution (1.0 $Na_2O$/3.22 $SiO_2$) 37% Solids | 10.0 |
| Water | 4.0 |
| Part B | |
| Acrylic-Aminoester Latex* 46% Solids | 16.7 |
| Benax 2Al (26% Solids) | 1.5 |
| Water | 12.8 |
| | 100.0 |

*Prepared according to U.S. Pat. No. 2,980,652

The acrylic-aminoester latex, in accordance with U.S. Pat. No. 2,980,652, is prepared as disclosed from the monomer such as Formula VI described in column 2 of U.S. Pat. No. 2,980,652 employing a peroxide catalyst described in column 3, lines 65–71 and column 4, lines 31–45; a non-ionic or anionic surfactant as described also in column 4, lines 7–14 and 60–70 is used. The acrylic reactant is disclosed in column 4, lines 70–75 and column 8, lines 6–70 of this patent. The acrylic-aminoester latex so prepared (and used in this invention) is not heated but rather is used in the present invention without heating. Preparation of an acrylic aminoester latex as described involves use of a small amount of surfactant (usually about 1–3% by weight) but this small amount employed in the preparation of the latex does not necessarily obviate the use of additional surfactant as described above as Benax 2Al (26% solids). However, the total amount of surfactant in the vehicle is quite small in that the amounts in the latex and that added to Part B are quite small and ordinarily does not exceed the amounts disclosed before. The surfactant does not significantly affect the properties of the final coating.

The diluted stabilized latex (Part B) is added to the mixed sodium-lithium-silicate solution (Part A) which is at approximately the same solids as the diluted latex. The addition is made slowly with good agitation.

EXAMPLE 4

A vehicle was prepared similarly as in Example 3 wherein the acrylic-aminoester latex was Rhoplex AC-61, a product of Rohm & Haas.

EXAMPLE 5

An alternative procedure for making the vehicles of the present invention is as follows:

| | Parts by Weight |
|---|---|
| Acrylic-Aminoester Latex* 46% Solids | 16.7 |
| Water | 16.8 |
| Benax 2al (26% Solids) | 1.5 |
| Sodium Silicate Solution (1.0 Na$_2$O/3.22 SiO$_2$) 37% Solids | 10.0 |
| Sodium-Lithium Silicate Solution of Example 2 | 55.0 |
| | 100.0 |

*Prepared according to U.S. Pat. No. 2,980,652

As described in Example 3 the ingredients are all added in the order listed above with good mixing.

EXAMPLE 6

Another composition in accordance with the present invention is made up as follows:

| | | Parts by Weight |
|---|---|---|
| Styrene/butadiene/itaconic acid interpolymer (50% Total Solids) | | 15.4 |
| Water | | 29.1 |
| Surfactant treated montmorilonite | Pre blend before adding to other ingredients | 1.0 |
| Benax 2Al (26% Solids) | | 1.5 |
| Sodium Silicate Solution (1.0 NaO/3.22 SiO$_2$) | | 10.0 |
| Sodium Lithium Silicate Sol'n of Example 2 | | 55.0 |
| | | 100.0 |

The ingredients are all added in the order listed above with good mixing. The styrene/butadiene/itaconic acid interpolymer may contain 60-70% styrene, 38-28% butadiene and 1-10% itaconic acid made by procedures well known in the art of latex polymerization and containing from 0.5-3.0% anionic surfactant such as sodium laural sulfate or a nonionic surfactant such as octyl phenoxypolyethoxy ethanol.

EXAMPLE 7

A vehicle using an interpolymer of styrene/-butadiene/taconic acid latex has been evaluated and also a zinc-containing composition. Salt fog exposures, solvent immersion tests, adhesion of coal tar epoxies, adhesion to nonsandblasted cold rolled steel, U.V. exposure of unpigmented vehicle, film build studies at 50° F. and 75% RH and a field test as well as 6 months ageing tests on this vehicle have all shown desirable results.

EXAMPLES 8-12

The following examples illustrate vehicles prepared by compounding various organic interpolymers with alkali-lithium silicate solutions which may be used in the present invention. The various vehicles were prepared

TABLE I

| Example | 8 | 9 | 10 | 11 | 12 |
|---|---|---|---|---|---|
| Sodium-lithium silicate solution of Example 2 (26% solids) | 55.8 | 55.8 | 55.8 | 55.8 | 55.8 |
| Sodium silicate solution ("N" Sil) (26% solids) | 14.2 | 14.2 | 14.2 | 14.2 | 14.2 |
| Water (added to latex before blending) | 12.7 | 12.7 | 12.7 | 14.4 | 13.7 |
| Interpolymer | | | | | |
| Methyl methacrylate/butyl acrylate/ aminoester (Rhoplex AC-61, product of Rohm & Haas) (46% solids) | 17.3 | | | | |
| Styrene/acrylonitrile 2-ethylhexyl acrylate (Ucar 680, a product of Union Carbide) (45% solids) | | 17.3 | | | |
| Ethyl methacrylate/2-ethylhexylacrylate/ vinylacetate (Thoplex MV-1, a product of Rohm & Haas) (46% solids) | | | 17.3 | | |
| Acrylonitrile/butadiene/styrene (Hycar 1877X8, a product of B.F. Goodrich (50% solids) | | | | 15.6 | |
| Styrene butadiene (Dow 762W, a product of Dow Chemical) (48% solids) | | | | | 16.3 | to determine the stability at or about room temperature (77° F.). Each of the vehicles which are set forth in Table 1 hereinafter exhibit outstanding stability.

EXAMPLES 13-17

To each of the vehicles of Examples 8-12 was added zinc dust to produce a zinc-enriched coating composition. The coating compositions were made up of about 23-24 parts by weight of the vehicle and about 76-77 parts by weight of zinc dust. The coating compositions were applied to Q panels and then scribed to the bare metal. The panels were placed in a salt fog cabinet at 85° F. for 1500 hours. Each of the panels exhibited excellent protection to corrosion both at the scribes and overall.

Besides the foregoing coating compositions, systems were prepared containing various percentages of the organic interpolymer latex as compared to the alkali-lithium silicate solution. It was found that when the interpolymer latex was between 10 to 40% of the coating composition by weight on a solids basis a suitable zinc enriched coating could be produced. While the ideal amount of the interpolymer required depended to some degree on the specific nature of the latex it was found that preferably 15-30% of the interpolymer latex was the optimum to obtain maximum corrosion protection.

The above coating compositions adhere to clean steel and will withstand extended immersion under running water after 24 hours. Salt fog exposures were run on sanded and sand-blasted steel panels for 1500 hours. Corrosion protection was comparable to conventional zinc-rich inorganic coating compositions. Normally, corrosion resistance is adversely affected by the addition of organic materials to inorganic coatings. Solvent and abrasion resistance were also of the same order of magnitude as those of the zinc-rich inorganics. Other latices known to the art do not exhibit good solvent resistance.

The following examples illustrate a vehicle and coating composition where only sodium silicate is used.

EXAMPLE 18

A vehicle was made as follows:

|  | Parts by Weight |
|---|---|
| Sodium Silicate Solution (37% Solids) | 58.5 |
| Rhoplex AC-33 (A product of Rohm & Haas) (46% Solids) | 28.0 |
| Water (Distilled) | 66.5 |
|  | 153.0 |

The above vehicle separated into two phases, organic and inorganic, within 24 hours. The latex had a grainy appearance and after standing several weeks the top layer or organic phase formed a gel which was not easily redispersed. Such a vehicle would be completely unsatisfactory as a commercial product due to its extremely short shelf-life.

EXAMPLE 19

A zinc-enriched coating composition was prepared using the vehicle of Example 18 together with zinc dust as follows:

|  | Parts by Weight |
|---|---|
| Vehicle of Example 18 | 23.4 |
| Zinc Dust | 76.6 |
|  | 100.0 |

The above zinc-rich coating composition was applied to sand-blasted steel. After 24 hours the coating was placed under running water. Within 15 minutes the coating had washed off to bare steel.

The foregoing examples 18 and 19 illustrate the importance of the lithium in the coating compositions of the present invention as contrasted to the coating composition utilizing sodium silicate solution alone. The compositions of this invention have extensive shelf-life, rapid attainment of water insensitivity, and impart outstanding corrosion resistance when applied to a steel panel which has been merely cleaned well.

The nature and objects of the present invention having been completely described and illustrated what we wish to claim as new and useful and secure by Letters Patent is:

1. A homogeneous vehicle for a zinc-enriched, self-curing, water-resistant coating composition consisting essentially of:
   a. between about 57 to 91 parts of an aqueous alkali-lithium silicate solution, said alkali and lithium silicates being employed in amounts sufficient to provide a molar ratio of $X_2O$, where X is selected from the group consisting of sodium, potassium, and quaternary ammonium, to lithium oxide to silicon dioxide, respectively, within the range from about 0.25 to 0.65 $X_2O$ : 0.35 to 0.75 $Li_2O$ : 2.5 to 4.5 $SiO_2$;
   b. between 9 and 40 parts of a film-forming organic alkali stable latex of an interpolymer selected from the group consisting of interpolymers of acrylonitrile/butadiene/styrene, of styrene/butadiene/maleic acid, of styrene/butadiene/itaconic acid and of styrene/butadiene; and
   c. between 0 and 3 parts of an alkali stable anionic surfactant.

2. A vehicle according to claim 1 wherein the organic alkali stable latex is a latex of an interpolymer of acrylonitrile/butadiene/styrene.

3. A vehicle according to claim 1 wherein the organic alkali stable latex is a latex of an interpolymer of styrene/butadiene.

4. A homogeneous vehicle for a zinc-enriched, self-curing, water-resistant coating composition consisting essentially of:
   a. between about 57 to 91 parts of an aqueous sodium-lithium silicate solution, said sodium and lithium silicates being employed in amounts sufficient to provide a molar ratio of sodium oxide ($Na_2O$) to lithium oxide ($Li_2O$) to silicon dioxide, repsectively, within the range from about 0.25 to 0.65 $Na_2O$ : 0.35 to 0.75 $Li_2O$ : 2.5 to 4.5 $SiO_2$;
   b. between 9 and 40 parts a of film-forming organic alkali stable latex of an interpolymer of styrene/butadiene/itaconic acid; and
   c. between 0 and 3 parts of an alkali stable anionic surfactant.

5. A coating which comprises 20 to 33 parts by weight of a vehicle of claim 1 wherein the latex is a latex of an interpolymer of styrene/butadiene, and 67 to 80 parts by weight of zinc dust.

6. A coating composition in accordance with claim 1 which comprises 20 to 33 parts by weight of a vehicle of claim 1, and 67 to 80 parts by weight of zinc dust.

7. A coating composition which comprises 20 to 33 parts by weight of a vehicle of claim 1 wherein the latex is a latex of an interpolymer of styrene/butadiene/acrylonitrile, and 67 to 80 parts by weight of zinc dust.

* * * * *